US012162275B2

(12) United States Patent
Lee et al.

(10) Patent No.: US 12,162,275 B2
(45) Date of Patent: Dec. 10, 2024

(54) INKJET APPARATUS AND METHOD OF ALIGNING THE SAME

(71) Applicant: Samsung Display Co., Ltd., Yongin-si (KR)

(72) Inventors: Jungmin Lee, Suwon-si (KR); Byeong-Hyun Kim, Suwon-si (KR); Donghyun Han, Suwon-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 140 days.

(21) Appl. No.: 17/880,077

(22) Filed: Aug. 3, 2022

(65) Prior Publication Data

US 2023/0191776 A1 Jun. 22, 2023

(30) Foreign Application Priority Data

Dec. 22, 2021 (KR) ........................ 10-2021-0184993

(51) Int. Cl.

*B41J 2/045* (2006.01)
*B41J 2/07* (2006.01)
*B41J 2/15* (2006.01)
*B41J 2/155* (2006.01)

(52) U.S. Cl.

CPC ............. *B41J 2/04505* (2013.01); *B41J 2/07* (2013.01); *B41J 2/155* (2013.01)

(58) Field of Classification Search

CPC ........... B41J 2/04505; B41J 2/07; B41J 2/155
See application file for complete search history.

(56) References Cited

U.S. PATENT DOCUMENTS

2010/0182382 A1 * 7/2010 Lee .......................... B41J 2/145
347/68

FOREIGN PATENT DOCUMENTS

KR 102176438 B1 11/2020

* cited by examiner

*Primary Examiner* — Jason S Uhlenhake
(74) *Attorney, Agent, or Firm* — CANTOR COLBURN LLP

(57) ABSTRACT

An inkjet apparatus includes a head pack including sub-head packs, at least one inkjet head coupled to each of the sub-head packs, a head pack aligner coupled to each of the sub-head packs, and including a first motor which moves each of the sub-head packs in a first rotation direction, a second motor which is disposed on the first motor and moves each of the sub-head packs in a first direction which is a longitudinal direction of each of the sub-head packs in a plan view, and a controller which controls a moving position of each of the sub-head packs and a head aligner coupled to the inkjet head and including a first adjusting member which moves the inkjet head in a second rotation direction and a second adjusting member which moves the inkjet head in a second direction which is a longitudinal direction of each of the inkjet head.

20 Claims, 21 Drawing Sheets

INKJET APPARATUS AND METHOD OF ALIGNING THE SAME

This application claims priority to Korean Patent Application No. 10-2021-0184993, filed on Dec. 22, 2021, and all the benefits accruing therefrom under 35 U.S.C. § 119, the content of which in its entirety is herein incorporated by reference.

BACKGROUND

1. Field

Embodiments relate to an inkjet apparatus. More particularly, embodiments relate to the inkjet apparatus and a method of aligning the same.

2. Description of the Related Art

Display displays an image for providing visual information to a user. Among the display devices, an organic light-emitting diode display is attracting attention due to advantages thereof.

An inkjet apparatus may be used when manufacturing the display device. The inkjet apparatus may include a head pack and inkjet heads coupled to the head pack. The inkjet apparatus may align the head pack and the inkjet heads to improve print quality of the display apparatus.

SUMMARY

Embodiments provide an inkjet apparatus with improved print quality.

Other embodiments provide a method of aligning the inkjet apparatus.

An inkjet apparatus in an embodiment may include a head pack including a plurality of sub-head packs, an inkjet head coupled to each of the plurality of sub-head packs, a head pack aligner coupled to each of the plurality of sub-head packs, and including a first motor which moves each of the plurality of sub-head packs in a first rotation direction, a second motor which is disposed on the first motor and moves each of the plurality of sub-head packs in a first direction which is a longitudinal direction of each of the plurality of sub-head packs in a plan view, and a controller which controls a moving position of each of the plurality of sub-head packs and a head aligner coupled to the inkjet head and including a first adjusting member moving the inkjet head in a second rotation direction and a second adjusting member which moves the inkjet head in a second direction which is a longitudinal direction of each of the inkjet head.

In an embodiment, the head pack aligner may include a first bearing as an axis in the first rotation direction, a connection member disposed between the first bearing and the first motor and coupled to each of the plurality of sub-head packs, and a second bearing coupling the connection member, the first motor and the second motor.

In an embodiment, the first bearing may be coupled to a first end of the connection member, the first motor may be coupled to a second end of the connection member in a direction which is perpendicular to the first direction and a direction parallel to a rotation axis of the first rotation direction, and the second motor may be coupled to the second end of the connection member in the first direction.

In an embodiment, the head pack aligner may move each of the plurality of sub-head packs in the first rotation direction using the first bearing and the first motor.

In an embodiment, the head pack aligner may further include a guide member disposed under the first bearing.

In an embodiment, the head pack aligner may move each of the plurality of sub-head packs in the first direction using the second motor and the guide member.

In an embodiment, the inkjet apparatus may further include a detector disposed under the head pack.

In an embodiment, the controller may control a moving position of each of the plurality of sub-head packs in response to image information received from the detector.

In an embodiment, the head aligner may further include a head plate disposed each of the plurality of sub-head packs, and the inkjet head may be rotatably coupled to the head plate.

In an embodiment, the first adjusting member may include an adjusting bolt contacting a first surface of the inkjet head and a leaf spring contacting a second surface opposite to the first surface.

In an embodiment, the second adjusting member may be coupled to a first end of the head plate in the second direction and is fixed to each of the plurality of sub-head packs.

In an embodiment, the head aligner may further include a first fixing bolt fixing the inkjet head and a second fixing bolt fixing the head plate.

A method of aligning an inkjet apparatus in an embodiment may include detecting a position of a sub-head pack included in a head pack through a detector disposed under the sub-head pack, controlling a moving position of the sub-head pack in a first rotation direction using a first motor receiving image information from the detector, and controlling a moving position of the sub-head pack using a second motor in a first direction which is a longitudinal direction of the sub-head pack in a plan view, moving an inkjet head in a second rotation direction using a first adjusting member and moving the inkjet head using a second adjusting member in a second direction which is a longitudinal direction of the inkjet head.

In an embodiment, the first motor may move in a direction perpendicular to a direction parallel to a rotation axis of the first rotation direction and the first direction, and the sub-head pack coupled to a connection member may move in the first rotation direction with reference to a first bearing as an axis through the first motor coupled to a first end of the connection member.

In an embodiment, the second motor may move in the first direction, and the sub-head pack coupled to a connection member may move in the first direction along a guide member coupled to a second end of the connection member through the second motor coupled to a first end of the connection member.

In an embodiment, the detector may photograph an align mark disposed on a lower surface of the sub-head pack, a controller connected to the detector may calculate a moving position in the first rotation direction and a moving position in the first direction of the sub-head pack, respectively, receiving photographed image information, and the controller may drive the first motor and the second motor, respectively, using a calculated moving position in the first rotation direction and the calculated moving position in the first direction.

In an embodiment, the second rotation direction may include a second-first rotation direction and a second-second rotation direction opposite to the second-first rotation direction, and the first adjusting member may include an adjusting bolt moving the inkjet head in the second-first rotation direction and a leaf spring moving the inkjet head in the second-second rotation direction.

In an embodiment, the second adjusting member may be coupled to a head plate to which the inkjet head is coupled and is fixed to the sub-head pack.

In an embodiment, the second adjusting member may include a first thread and the head plate may include a second thread.

In an embodiment, the head plate may move in the second direction when the first thread is rotationally coupled to the second thread.

In a display device in embodiments of the invention, since the head pack includes the plurality of sub-head packs, only some of the sub-head packs may be replaced when the inkjet head is replaced. Accordingly, the process time and cost of the inkjet printing process may be reduced.

Since the head pack may be individually aligned in the first rotation direction and the first direction by the head pack aligner (e.g., the first motor and the second motor), and the inkjet head may be individually aligned in the second rotation direction and the second direction by the head aligner, an alignment degree of the head pack and the inkjet head may be improved. Accordingly, in the inkjet printing process using the inkjet apparatus, print quality may be improved, and yield may be improved.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
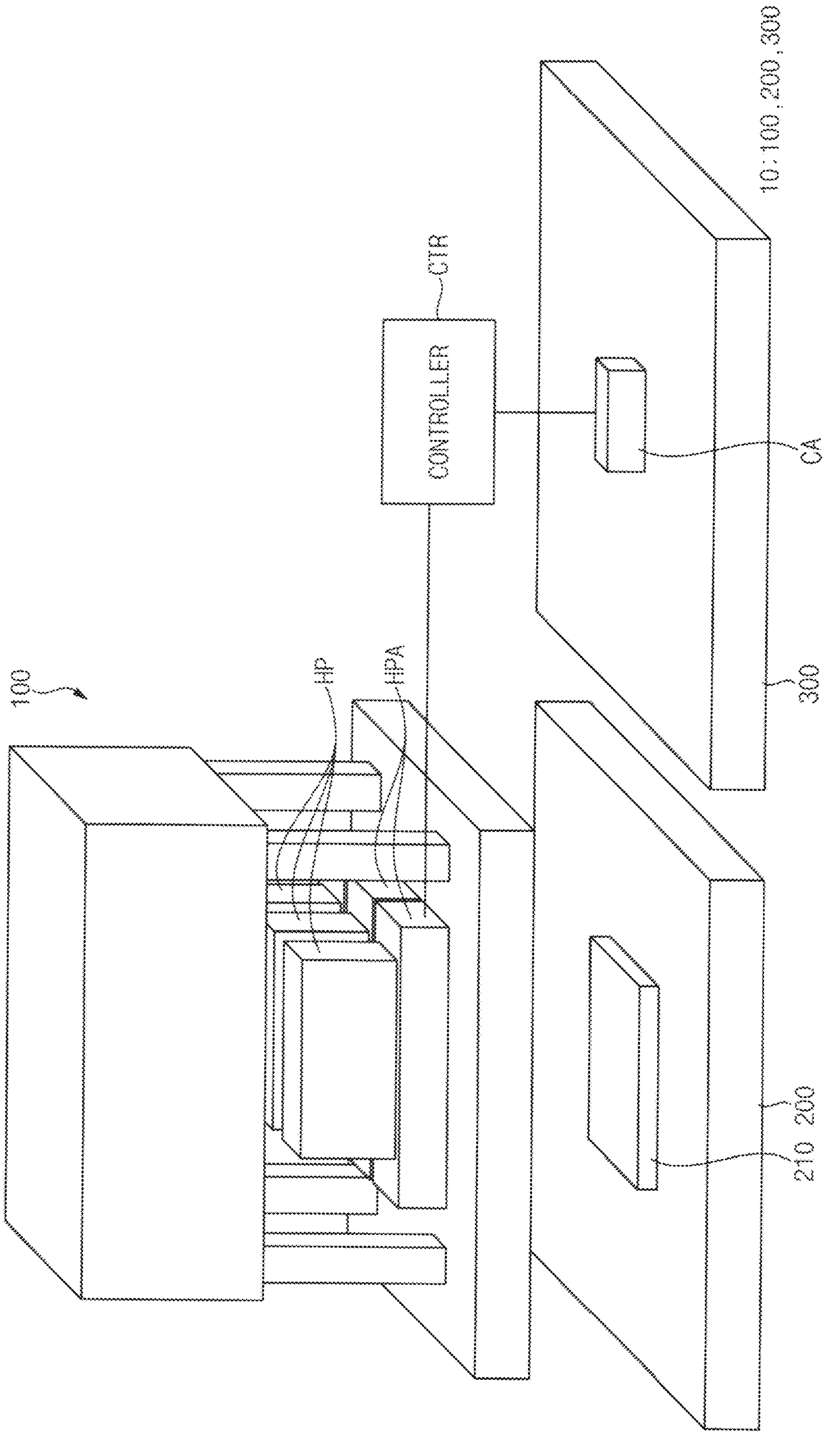
FIG. 1 is a perspective view illustrating an embodiment of an inkjet apparatus according to the invention.

Hereinafter, display devices in embodiments will be described in more detail with reference to the accompanying drawings. The same reference numerals are used for the same components in the drawings, and redundant descriptions of the same components will be omitted.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Figure 2:
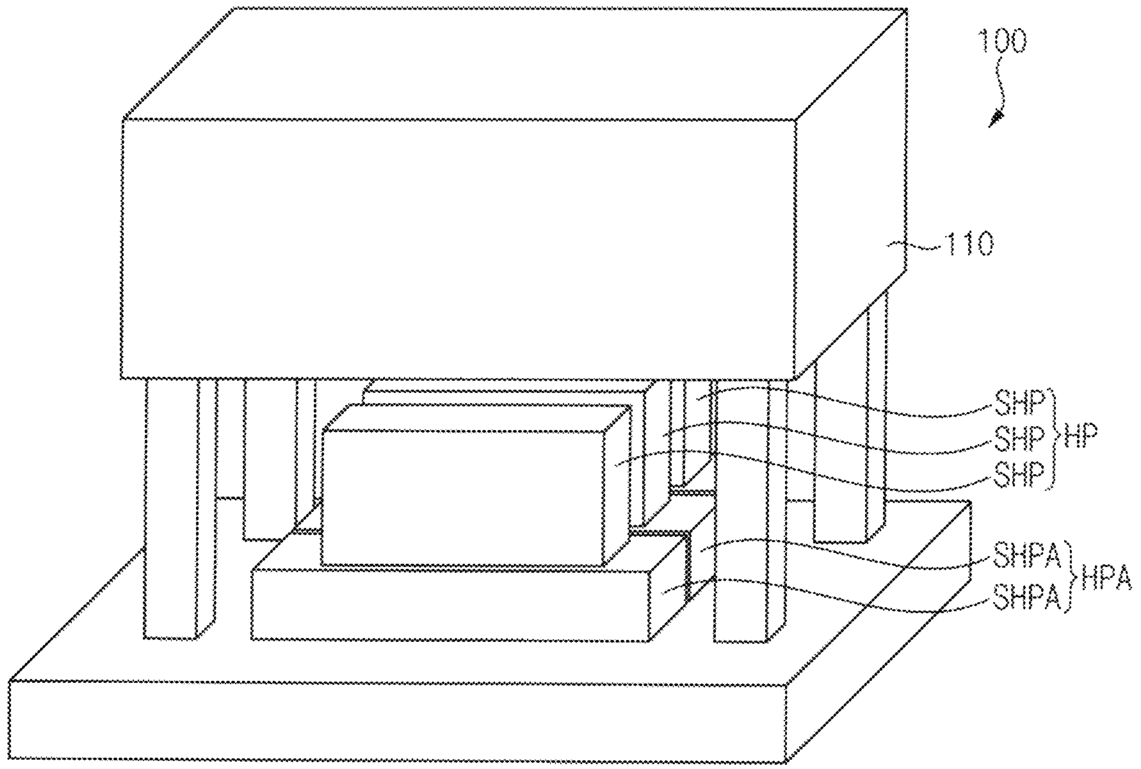
FIG. 2 is a perspective view illustrating a head module included in the inkjet apparatus of FIG. 1.

FIG. 1 is a perspective view illustrating an embodiment of an inkjet apparatus according to the invention. FIG. 2 is a perspective view illustrating a head module included in the inkjet apparatus of FIG. 1.

Referring to FIGS. 1 and 2, an inkjet apparatus 10 may include a head module 100, an application stage 200, and an alignment stage 300.

Figure 6:
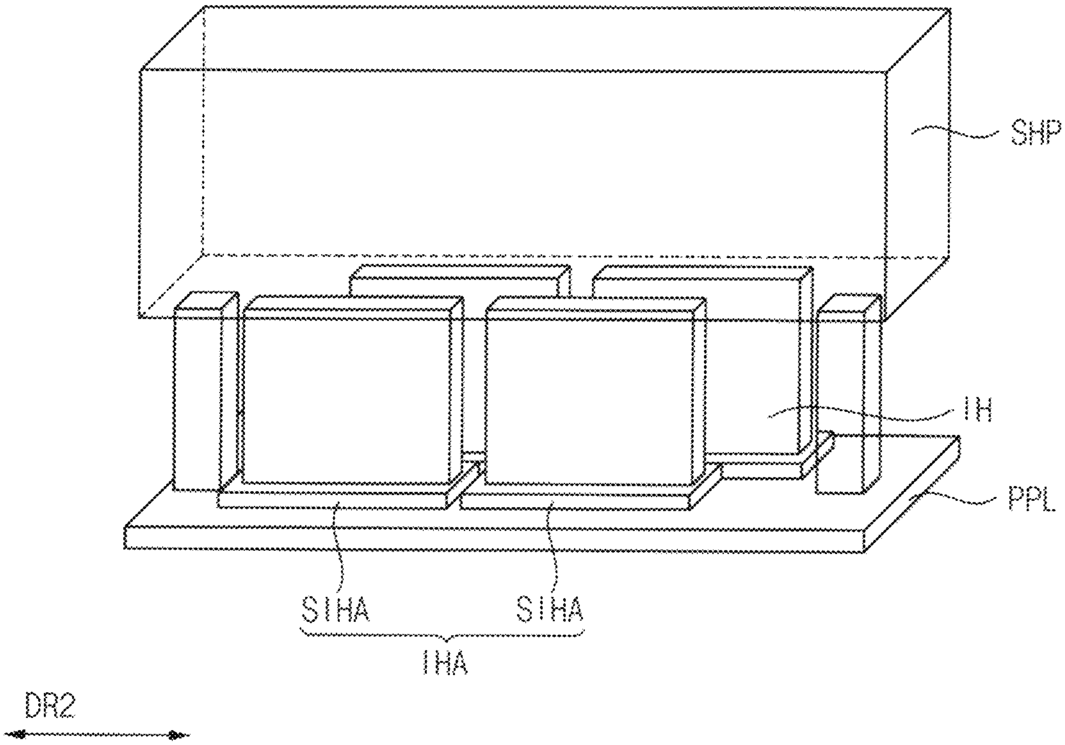
FIG. 6 is a perspective view illustrating the sub-head pack, the inkjet head, and the head aligner included in the head module of FIG. 2.

The head module 100 may include a head member 110, a head pack HP, a head pack aligner HPA, an inkjet head (e.g., an inkjet head IH of FIG. 6), and a head aligner (e.g., a head aligner IHA of FIG. 6). The head module 100 may be a portion from which ink is discharged.

The application stage 200 may be disposed under the head module 100. The application stage 200 may be a portion on which an inkjet printing process is performed. An object 210 on which the ink is printed may be disposed on the application stage 200.

The alignment stage 300 may be spaced apart from the application stage 200, and may be disposed under the head module 100. The alignment stage 300 may be a portion in which the head pack HP included in the head module 100 is aligned. The alignment stage 300 may include a detector CA which detects (e.g., photographs) the head pack HP. The detector CA may be disposed under the head pack HP. In an embodiment, the detector CA may be a camera, but is not limited thereto, and may be various other image sensing/recording devices. The detector CA may generate image information by photographing the head pack HP.

The head member 110 may be a member except for the head pack HP, the head pack aligner HPA, the inkjet head, and the head aligner among the head module 100. The head pack HP and the head pack aligner HPA may be coupled to the head member 110.

The head pack HP may include a plurality of sub-head packs SHP. At least one inkjet head IH may be coupled to each of the plurality of sub-head packs SHP. In an embodiment, the head pack HP may include three sub-head packs SHP, and four inkjet heads may be coupled to one sub-head pack SHP, for example.

The head pack aligner HPA may be coupled to each of the sub-head packs SHP. The head pack aligner HPA may align each of the sub-head packs SHP. The head pack aligner HPA may include a plurality of sub-pack aligners SHPA. Each of the sub-pack aligners SHPA may be coupled to each of the sub-head packs SHP. That is, one sub-pack aligner SHPA may be coupled to one sub-head pack SHP. Each of the sub-head packs SHP may be individually aligned by each of the sub-pack aligners SHPA.

The head pack aligner HPA may include a controller CTR. The controller CTR may be respectively connected to the sub-pack aligners SHPA. The controller CTR may be connected to the detector CA. The controller CTR may receive the image information photographed by the detector CA. The controller CTR may control a moving position of each of the sub-head packs SHP by receiving the image information.

Figure 3:
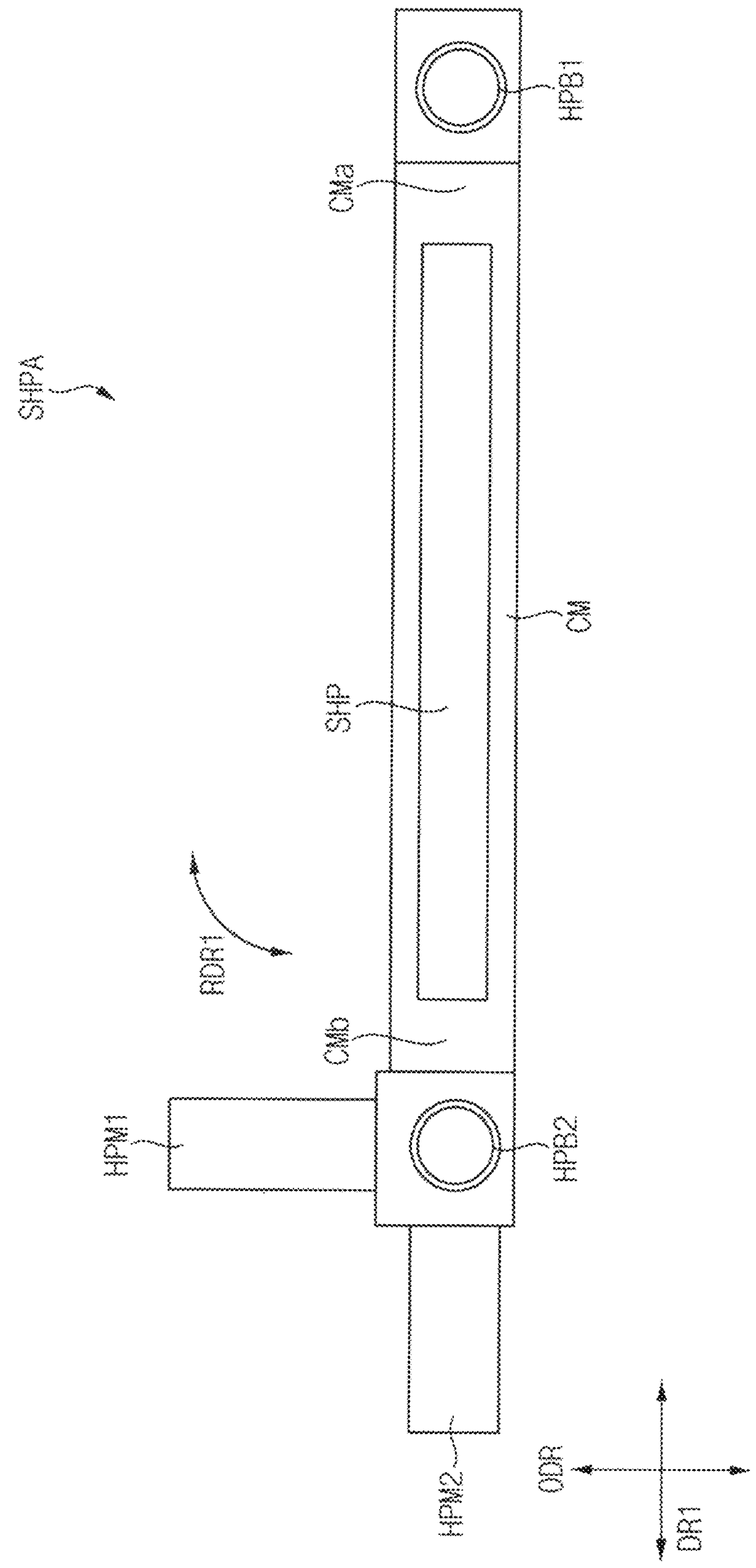
FIG. 3 is a plan view illustrating a head pack aligner included in the head module of FIG. 2.
Figure 4:
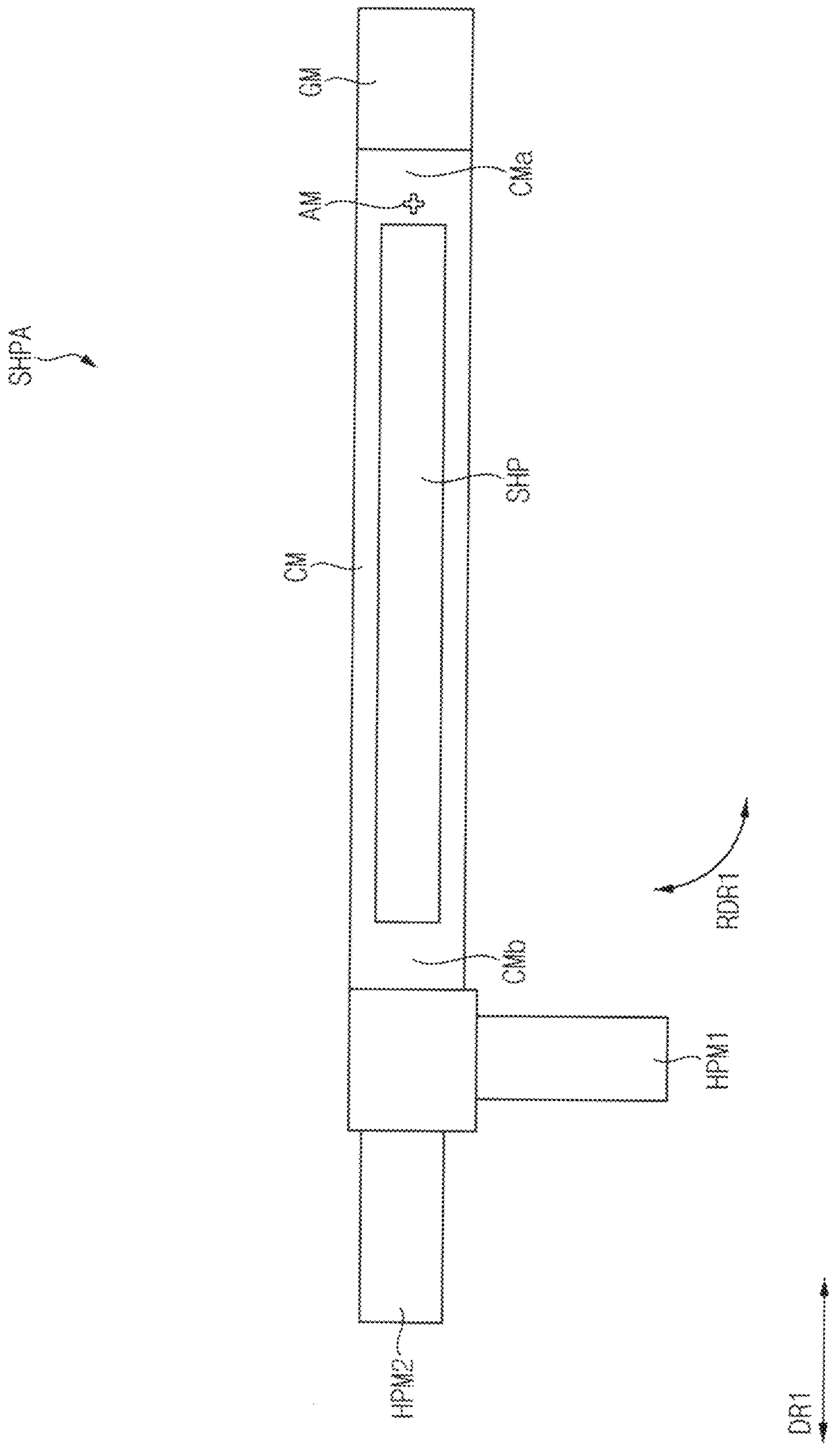
FIG. 4 is a bottom view illustrating the head pack aligner of FIG. 3.
Figure 5:
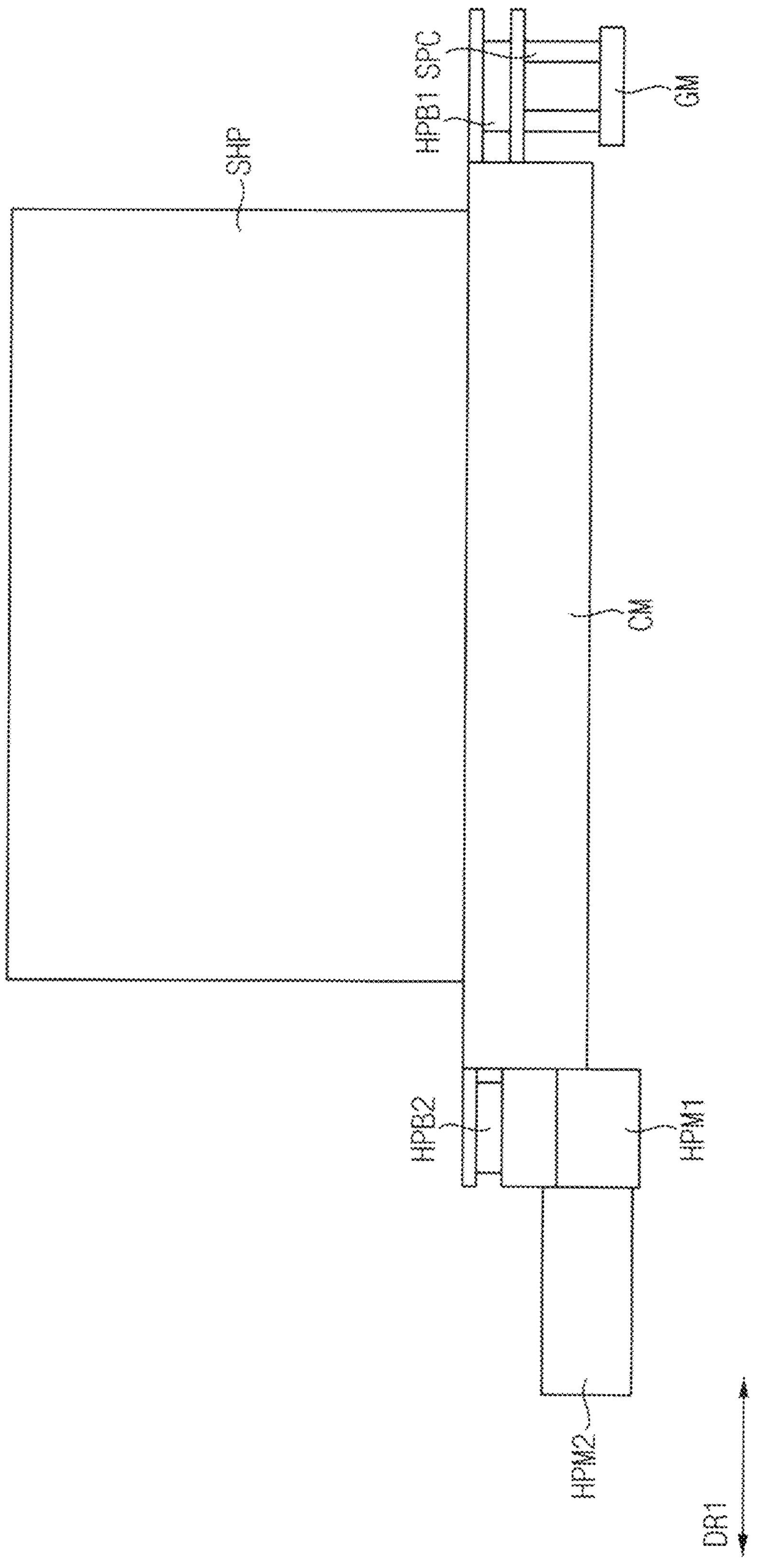
FIG. 5 is a front view illustrating the head pack aligner of FIG. 3.

FIG. 3 is a plan view illustrating a head pack aligner included in the head module of FIG. 2. FIG. 4 is a bottom view illustrating the head pack aligner of FIG. 3. FIG. 5 is a front view illustrating the head pack aligner of FIG. 3.

Referring to FIGS. 1 to 5, the head pack aligner HPA may include the sub-pack aligners SHPA and the controller CTR. The sub-head pack SHP may be coupled to the sub-pack aligner SHPA.

The sub-pack aligner SHPA may include a first motor HPM1, a second motor HPM2, a first bearing HPB1, a second bearing HPB2, a connection member CM, a spacer SPC, and a guide member GM.

The sub-head pack SHP may be coupled to the connection member CM. The first bearing HPB1 may be coupled to a first end CMa of the connection member CM. The guide member GM may be coupled to the first end CMa of the connection member CM. The guide member GM may be disposed under the first bearing HPB1. The spacer SPC may be disposed between the guide member GM and the first bearing HPB1. The spacer SPC may match a height of the first bearing HPB1 with that of the connection member CM and the second bearing HPB2.

The second bearing HPB2 may be coupled to a second end CMb opposite to the first end CMa of the connection member CM. The first motor HPM1 may be coupled to the second end CMb of the connection member CM. The second motor HPM2 may be coupled to the second end CMb of the connection member CM. That is, in a plan view, the connection member CM may be disposed between the first bearing HPB1 and the first motor HPM1. The second motor HPM2 may be disposed on the first motor HPM1. The second bearing HPB2 may connect the connection member CM to the first motor HPM1 and the second motor HPM2.

The first motor HPM1 may move the sub-head pack SHP in a first rotation direction RDR1. The second motor HPM2 may move the sub-head pack SHP in a first direction DR1. The first direction DR1 may be a longitudinal direction of the sub-head pack SHP in a plan view. A rotation axis of the first rotation direction RDR1 may be parallel to a height direction (e.g., vertical direction in FIG. 5) of the sub-head pack SHP. The first rotation direction RDR1 may be a rotation direction with reference to the first bearing HPB1 as an axis. The first rotation direction RDR1 may include both a clockwise direction and a counterclockwise direction with reference to the first bearing HPB1 as an axis.

The first motor HPM1 may be coupled to the connection member CM in an orthogonal direction ODR perpendicular to both the first direction DR1 and a direction parallel to the rotation axis of the first rotation direction RDR1. The second motor HPM2 may be coupled to the connection member CM in the first direction DR1.

An align mark AM may be disposed on a lower surface of the sub-head pack SHP. The detector CA may recognize and photograph the align mark AM. The controller CTR may control a moving position of the sub-head pack SHP by the align mark AM photographed by the detector CA. The controller CTR may control a moving position of the sub-head packs SHP in the first rotation direction RDR1 and a moving position of the sub-head pack SHP in the first direction DR1, respectively. The controller CTR may drive the first motor HPM1 and the second motor HPM2 according to the moving position, respectively.

In an embodiment, the sub-pack aligner SHPA may move the sub-head pack SHP in the first rotation direction RDR1 using the first bearing HPB1 and the first motor HPM1. The first motor HPM1 may be automatically driven according to the moving position in the first rotation direction RDR1. When the first motor HPM1 is driven, the first motor HPM1 may move in the orthogonal direction ODR. However, since the first bearing HPB1 is fixed, the sub-pack aligner SHPA may move in the first rotation direction RDR1 with the first bearing HPB1 as an axis.

The head pack aligner HPA may move the sub-head pack SHP in the first direction DR1 using the second motor HPM2 and the guide member GM. The second motor HPM2 may be automatically driven according to a moving position in the first direction DR1. When the second motor HPM2 is driven, the second motor HPM2 may move in a linear direction in the first direction DR1. When the second motor HPM2 moves, the sub-pack aligner SHPA may move in the first direction DR1 along the guide member GM.

Figure 7:
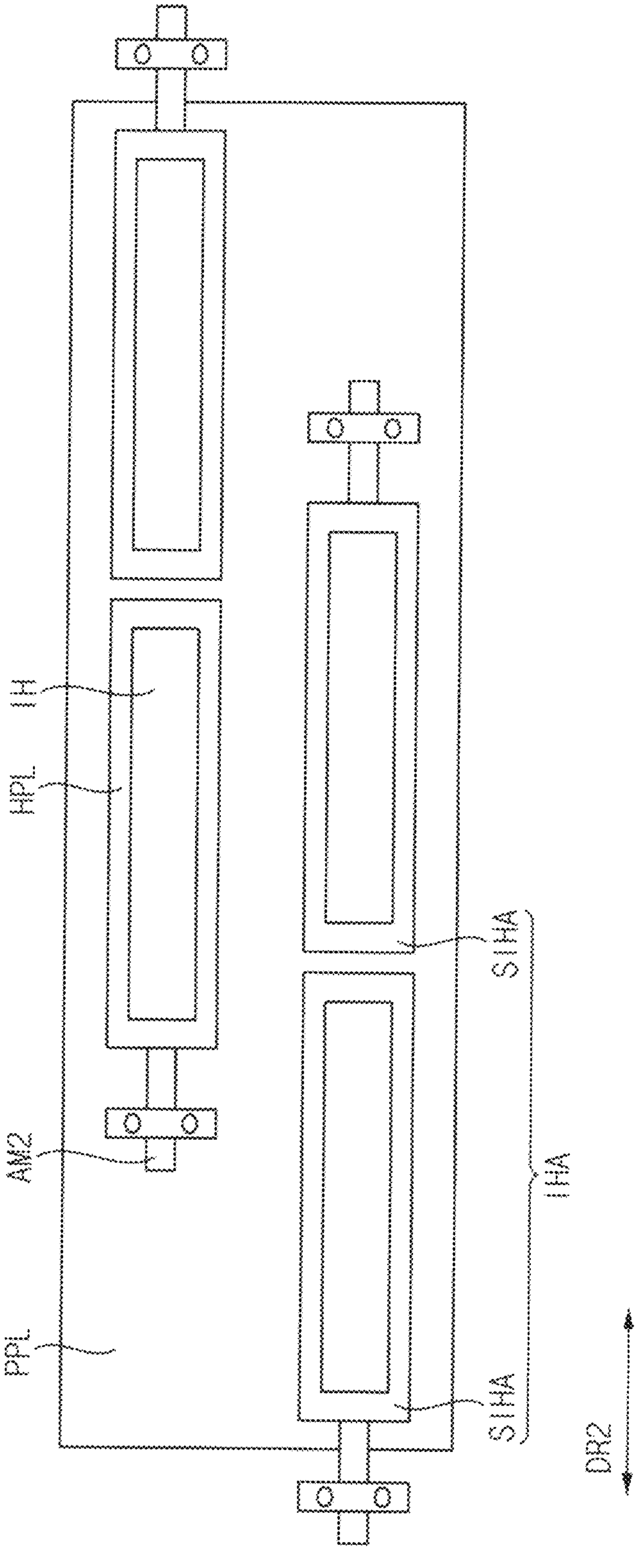
FIG. 7 is a plan view illustrating the sub-head pack, the inkjet head, and the head aligner of FIG. 3.

FIG. 6 is a perspective view illustrating the sub-head pack, the inkjet head, and the head aligner included in the head module of FIG. 2. FIG. 7 is a plan view illustrating the sub-head pack, the inkjet head, and the head aligner of FIG.

Figure 8:
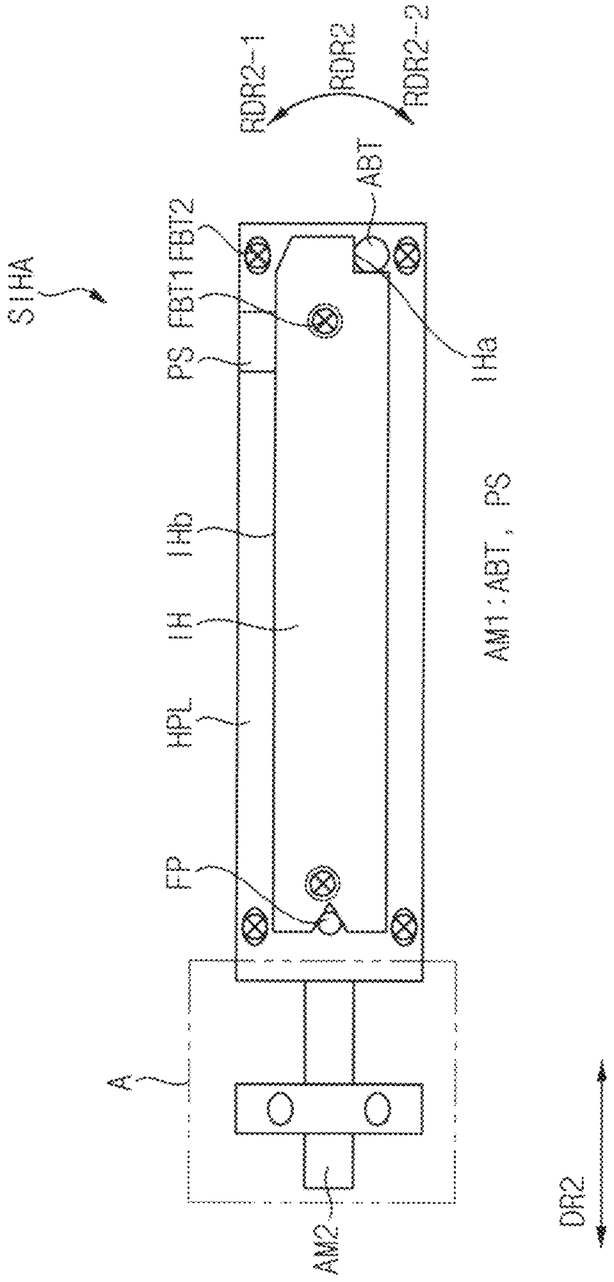
FIG. 8 is a plan view illustrating the head aligner and the inkjet head of FIG. 7.
Figure 9:
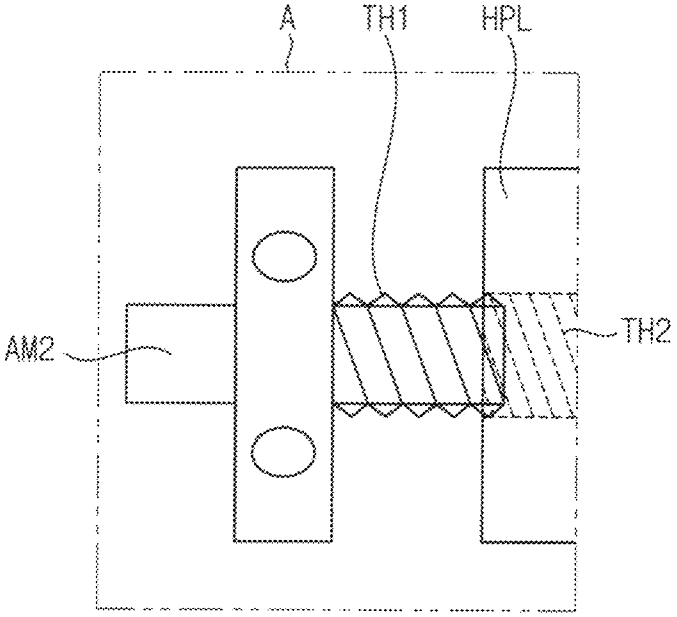
FIG. 9 is an enlarged plan view of area A of FIG. 8.

3. FIG. 8 is a plan view illustrating the head aligner and the inkjet head of FIG. 7. FIG. 9 is an enlarged plan view of area A of FIG. 8.

Referring to FIGS. 6 to 9, the sub-head pack SHP may include a pack plate PPL. The head aligner IHA and the inkjet heads IH may be disposed on the pack plate PPL.

The head aligner IHA may be coupled to each of the inkjet heads IH. The head aligner IHA may align each of the inkjet heads IH. The head aligner IHA may include a plurality of sub-head aligners SIHA. Each of the sub-head aligners SIHA may be coupled to each of the inkjet heads IH. That is, one sub-head aligner SIHA may be coupled to one inkjet head IH. Each of the inkjet heads IH may be individually aligned by each of the sub-head aligners SIHA.

The sub-head aligner SIHA may include a first adjusting member AM1, a second adjusting member AM2, a head plate HPL, a first fixing bolt FBT1, a second fixing bolt FBT2, and a fixing pin FP.

The head plate HPL may be disposed on the pack plate PPL included in the sub-head pack SHP. The inkjet head IH may be coupled to the head plate HPL. The inkjet head IH may be rotatably coupled to the head plate HPL.

The fixing pin FP and the first adjusting member AM1 may be disposed on the head plate HPL. The second adjusting member AM2 may be coupled to a first end of the head plate HPL.

The first adjusting member AM1 may move the inkjet head IH in a second rotation direction RDR2. The second adjusting member AM2 may move the inkjet head IH in a second direction DR2. The second direction DR2 may be a longitudinal direction of the inkjet head IH in a plan view. A rotation axis of the second rotation direction RDR2 may be parallel to a height direction of the inkjet head IH. The second rotation direction RDR2 may be a rotation direction with reference to the fixing pin FP as an axis. The second rotation direction RDR2 may include both a clockwise direction and a counterclockwise direction with reference to the fixing pin FP as an axis. In an embodiment, the counterclockwise direction among the second rotation directions RDR2 may be a second-first rotation direction RDR2-1, and the clockwise direction among the second rotation directions RDR2 may be a second-second rotation direction RDR2-2, for example.

The first adjusting member AM1 may include an adjusting bolt ABT and a leaf spring PS. The adjusting bolt ABT may contact a first surface IHa of the inkjet head IH. The leaf spring PS may contact a second surface IHb of the inkjet head IH. The second surface IHb may be opposite to the first surface IHa.

The adjusting bolt ABT may be an eccentric shaft adjusting bolt. The adjusting bolt ABT may push the inkjet head IH in the second-first rotation direction RDR2-1 according to a degree of eccentricity of the adjusting bolt ABT. In addition, the leaf spring PS may have a restoring force. Accordingly, when the external force applied to the inkjet head IH disappears, the leaf spring PS may return the inkjet head IH to its original position.

The second adjusting member AM2 may be coupled to a first end of the head plate HPL in the second direction DR2. The second adjusting member AM2 may move the inkjet head IH in the second direction DR2 through the head plate HPL.

The second adjusting member AM2 may include a first thread TH1. The head plate HPL may include a second thread TH2. The first thread TH1 and the second thread TH2 may be rotationally coupled.

The second adjusting member AM2 may be fixed to the pack plate PPL. Accordingly, when the first thread TH1 and the second thread TH2 are rotationally coupled, a position of the second adjusting member AM2 may not change. As the position of the second adjusting member AM2 does not change, the pack plate PPL rotationally coupled to the second adjusting member AM2 may move. Accordingly, the second adjusting member AM2 may move the inkjet head IH coupled to the pack plate PPL in the second direction DR2.

After the first adjusting member AM1 aligns the inkjet head IH in the second rotation direction RDR2, the first fixing bolt FBT1 may fix the inkjet head IH to the head plate HPL.

The second fixing bolt FBT2 may fix the head plate HPL to the pack plate PPL in the second direction DR2. After the second adjusting member AM2 aligns the head plate HPL in the second direction DR2, the second fixing bolt FBT2 may fix the inkjet head IH to the pack plate PPL.

In an embodiment, since the head pack HP includes the plurality of sub-head packs SHP, only some of the sub-head packs SHP may be replaced when the inkjet head IH is replaced. Accordingly, the process time and cost of the inkjet printing process may be reduced.

In an embodiment, as the first motor HPM1 included in the head pack aligner HPA moves the head pack HP in the first rotation direction RDR1, and the second motor HPM2 moves the head pack HP in the first direction DR1, an alignment degree of the head pack HP may be improved. Also, as the first adjusting member AM1 included in the head aligner IHA moves the inkjet head IH in the second rotation direction RDR2, and the second adjusting member AM2 moves the inkjet head IH in the second direction DR2, the alignment degree of the inkjet head IH may be improved. Accordingly, when the inkjet printing process is performed using the inkjet apparatus 10, the print quality may be improved and the yield may be improved.

FIGS. 10 to 21 are views for explaining an embodiment of a method of aligning an inkjet apparatus according to the invention. A method of aligning an inkjet apparatus described with reference to FIGS. 10 to 21 may be a method of aligning the inkjet apparatus 10 described with reference to FIGS. 1 to 9. Accordingly, among the method of aligning an inkjet apparatus described with reference to FIGS. 10 to 21, a description overlapping with the inkjet apparatus 10 described with reference to FIGS. 1 to 9 may be omitted.

Figure 10:
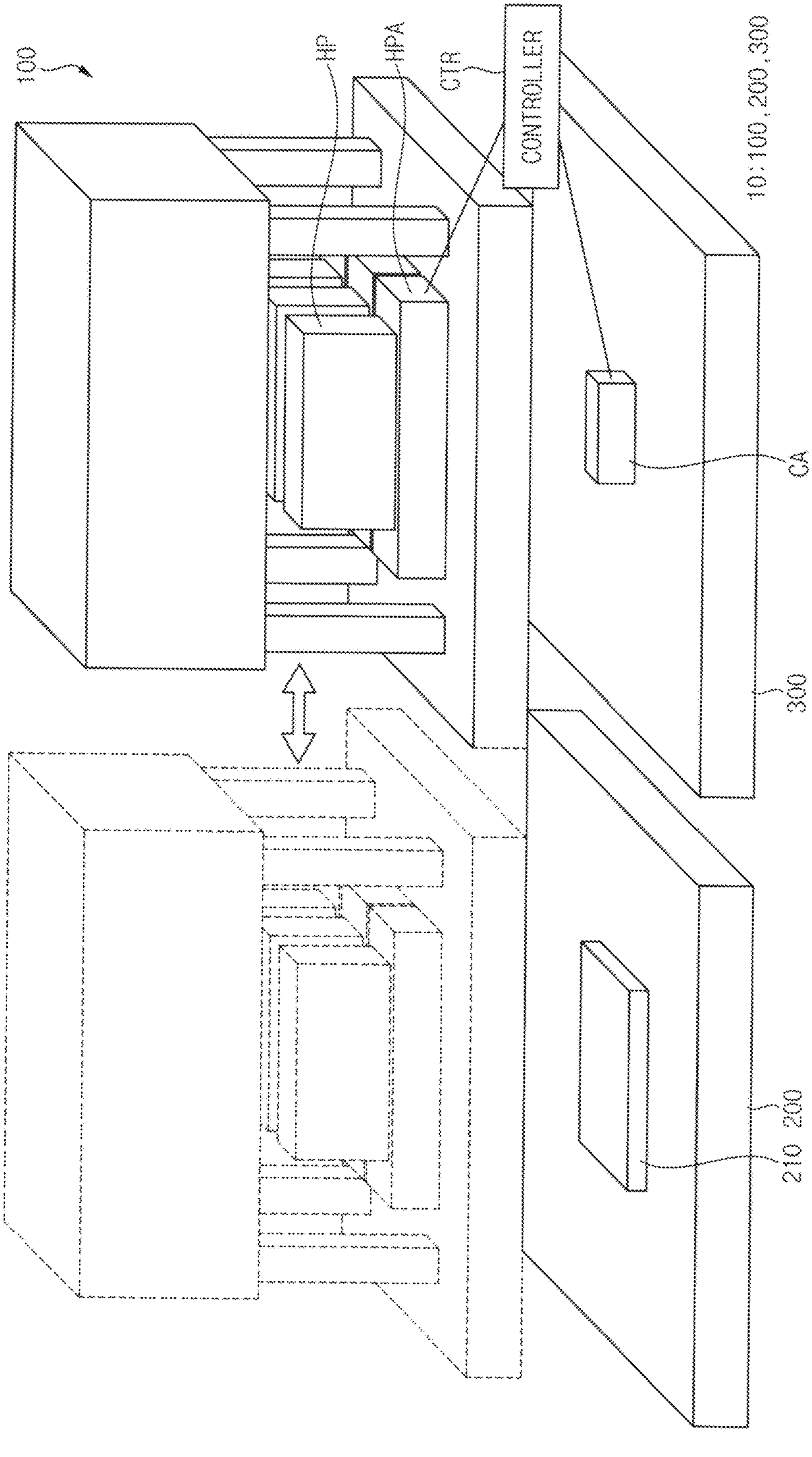
FIGS. 10 to 21 are views for explaining an embodiment of a method of aligning an inkjet apparatus according to the invention.

Referring to FIG. 10, the inkjet apparatus 10 may include a head module 100, an application stage 200, and an alignment stage 300. The head module 100 may include a head pack HP, a head pack aligner HPA, an inkjet head (e.g., the inkjet head IH of FIG. 6), and a head aligner IHA (refer to FIG. 6). The head pack aligner HPA may include the sub-pack aligners SHPA and the controller CTR. A object 210 may be disposed on the application stage 200, and the alignment stage 300 may include a detector CA.

The head module 100 may print ink on the object 210 on the application stage 200. The head module 100 may be aligned on the alignment stage 300. Specifically, the head pack HP may be aligned on the alignment stage 300. The head module 100 may be disposed on the application stage 200 when performing the inkjet printing process, and may be disposed on the alignment stage 300 when aligning the head pack HP and the inkjet head IH included in the head module 100. The head module 100 may move from the application stage 200 to the alignment stage 300, and may also move in the opposite direction.

Hereinafter, the head pack HP may be described as a sub-head pack SHP, the head pack aligner HPA as a sub-pack aligner SHPA, and the head aligner IHA as a sub-head aligner SIHA, respectively.

Figure 11:
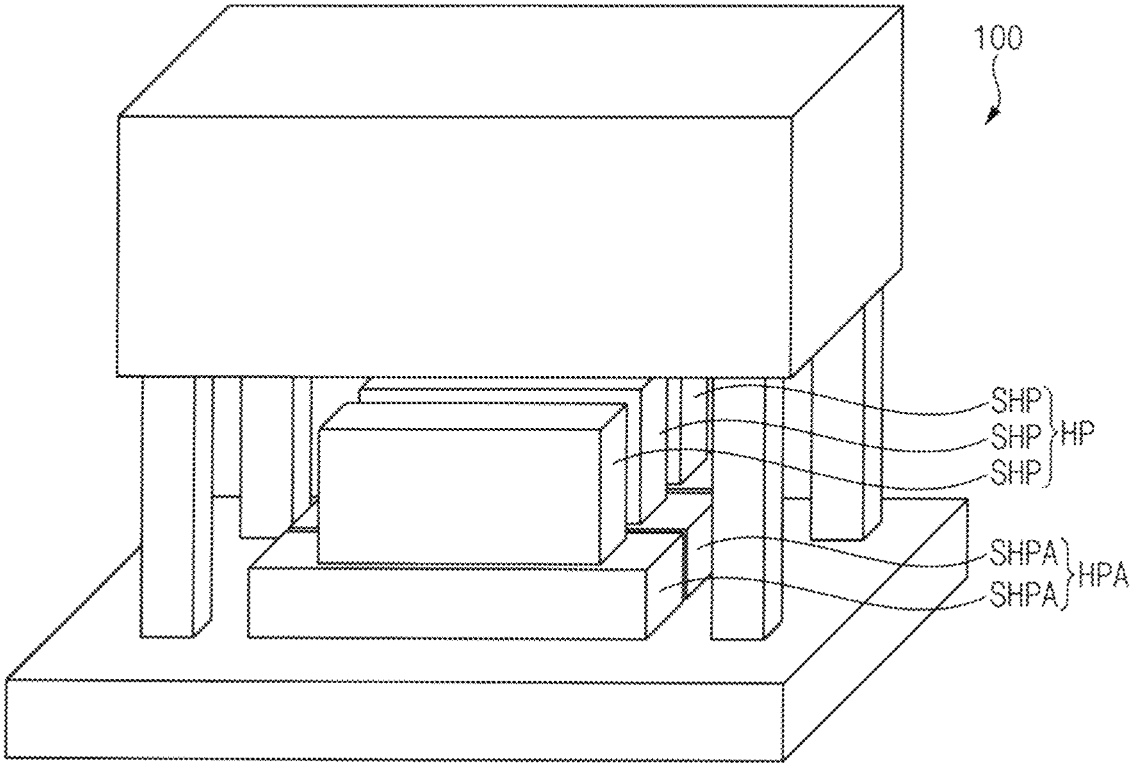

Referring to FIGS. 10 and 11, when the head module 100 is disposed on the alignment stage 300, the detector CA may be disposed under the sub-head pack SHP. The detector CA may detect a position of the sub-head pack SHP. The detector CA may recognize an align mark (e.g., the align mark AM of FIG. 4) disposed on a lower surface of the sub-head pack SHP, and photograph the align mark. The detector CA may generate image information by photographing the sub-head pack SHP. The controller CTR may be connected to the detector CA.

Figure 12:
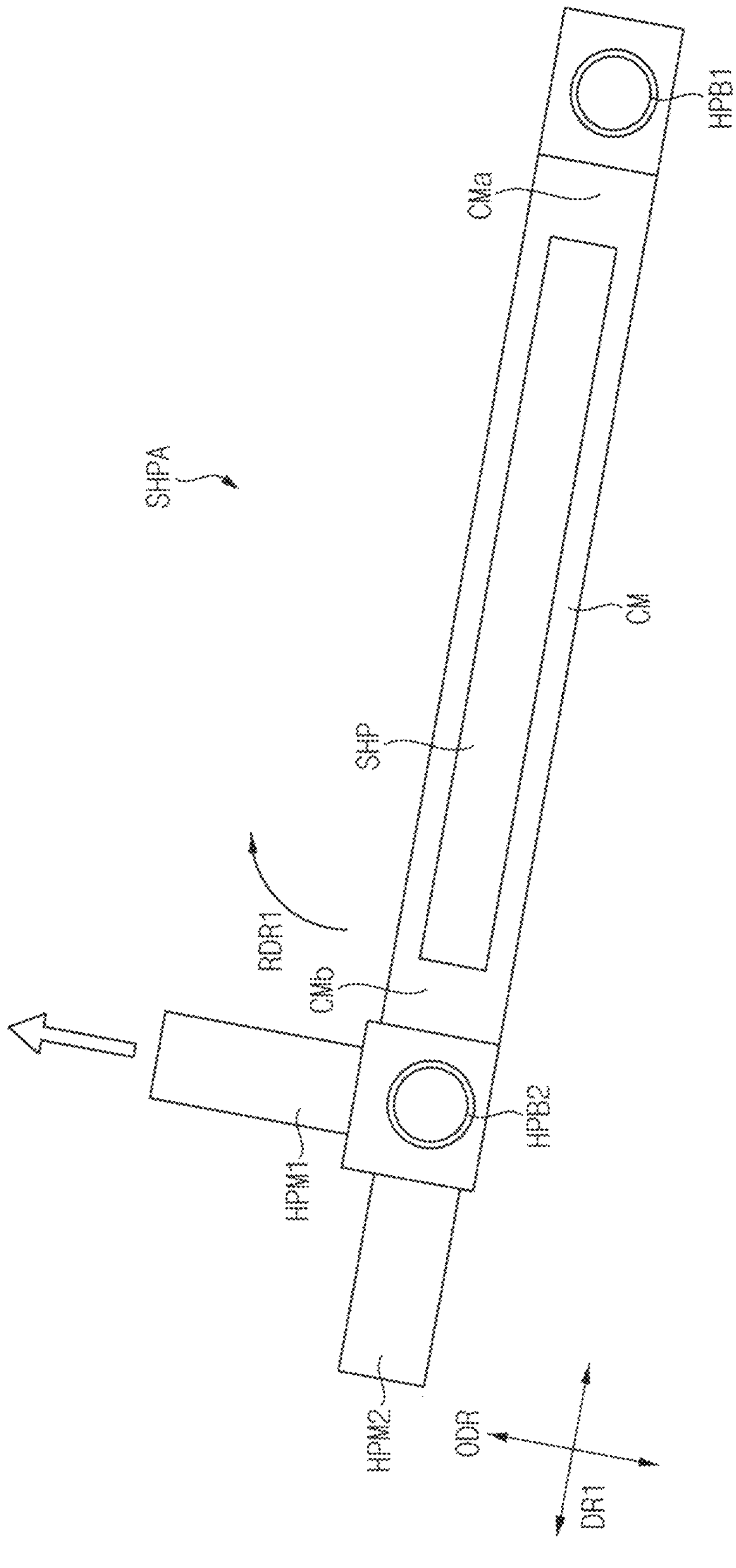
Figure 13:
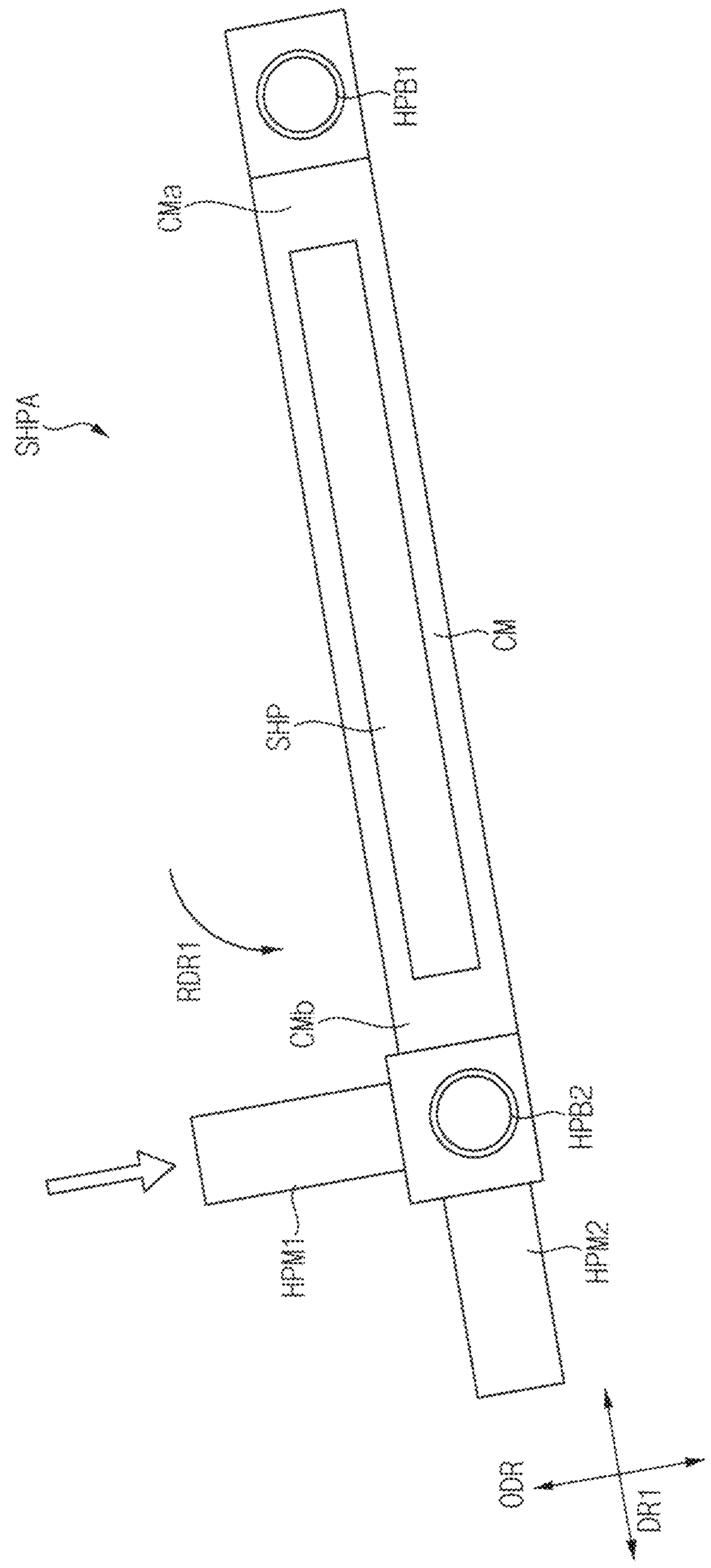

FIGS. 12 and 13 are plan views illustrating a state in which the sub-pack aligner SHPA moves in a first rotation direction RDR1. FIG. 12 is a plan view illustrating an embodiment of a clockwise movement of the sub-pack aligner SHPA in the first rotation direction RDR1, for example. FIG. 13 is a plan view illustrating a counterclockwise movement of the sub-pack aligner SHPA in the first rotation direction RDR1.

Figure 15:
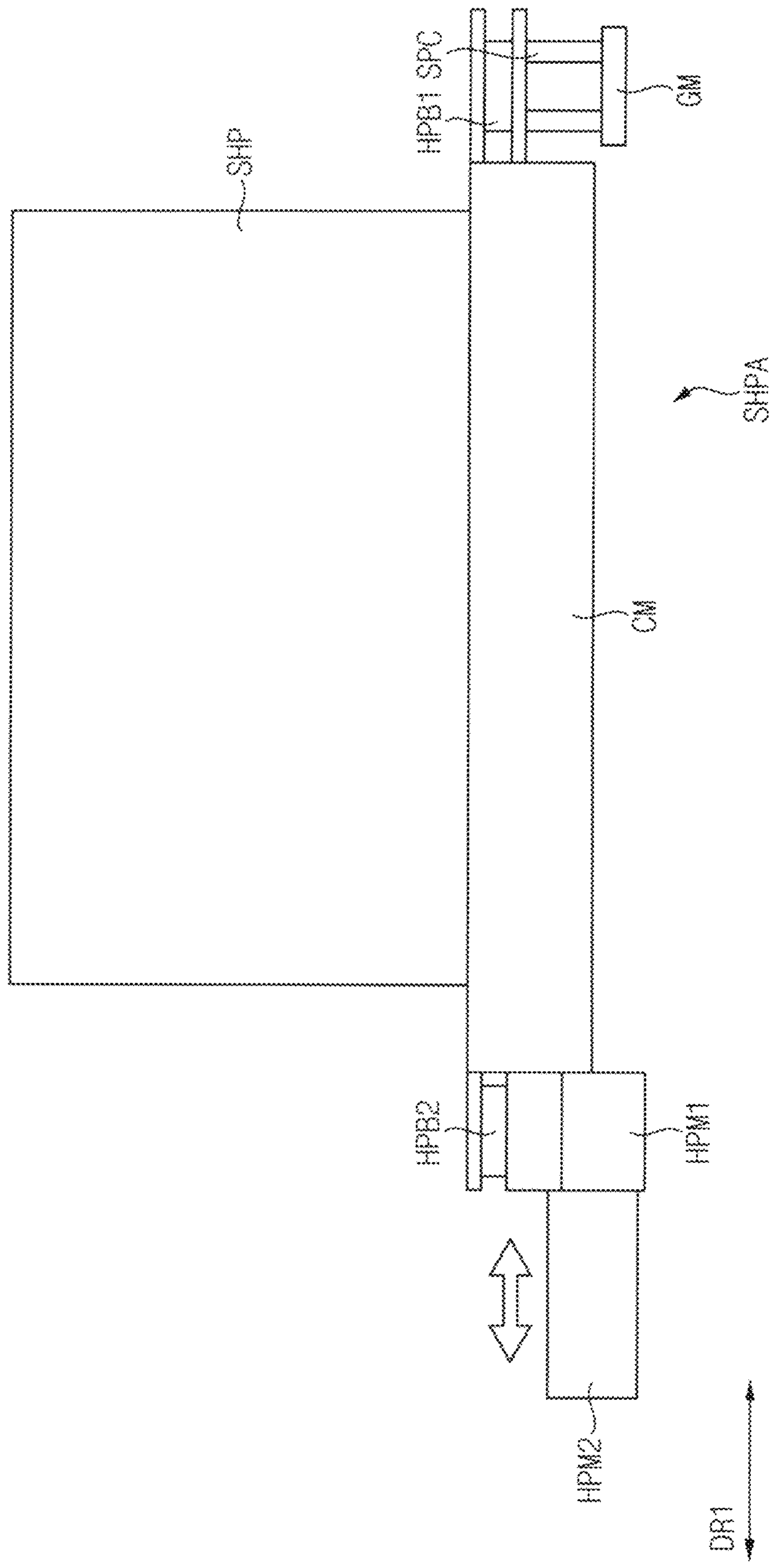

Referring to FIGS. 10 to 13, the sub-pack aligner SHPA may include a first motor HPM1, a second motor HPM2, a first bearing HPB1, a second bearing HPB2, and a connection member CM, a spacer SPC (refer to FIG. 15), and a guide member GM (refer to FIG. 15). The sub-pack aligner SHPA may be connected to a controller CTR.

The controller CTR may receive the image information from the detector CA. The controller CTR may control a moving position of the sub-head pack SHP in the first rotation direction RDR1 using the first motor HPM1. The controller CTR may control a moving position of the sub-head pack SHP in the first direction DR1 using the second motor HPM2.

Specifically, the controller CTR may calculate the moving position of the sub-head pack SHP in the first rotation direction RDR1 and the moving position of the sub-head pack SHP in the first direction DR1, respectively, based on the image information. The controller CTR may drive the first motor HPM1 and the second motor HPM2 using the calculated moving position of the sub-head pack SHP in the first rotation direction RDR1 and the calculated moving position of the sub-head pack SHP in the first direction DR1. Accordingly, the alignment of the sub-head pack SHP may be automatically performed through the controller CTR.

Figure 14:
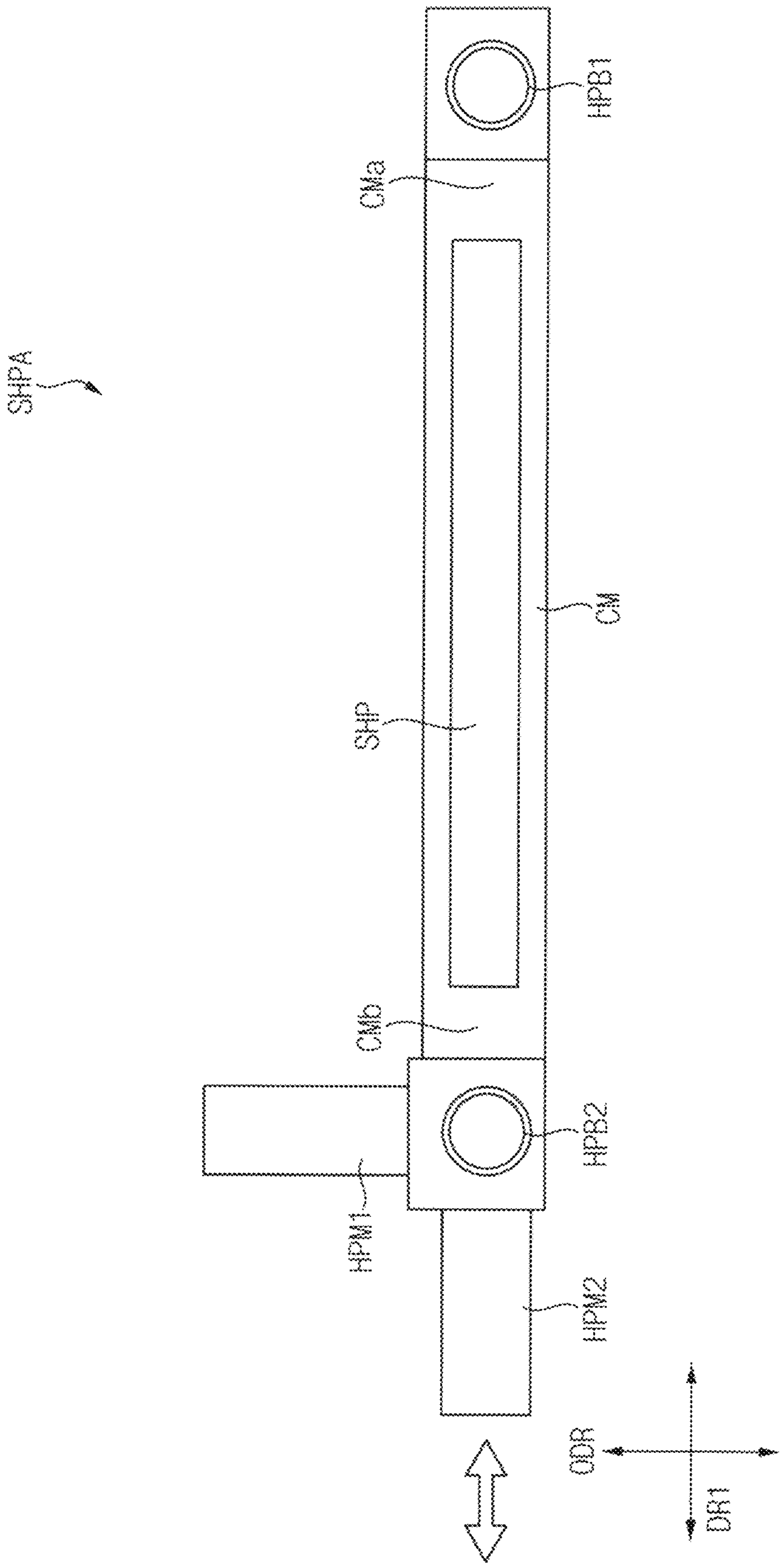

FIG. 14 is a plan view illustrating an operation of the sub-pack aligner SHPA moving in the first direction DR1. FIG. 15 is a front view illustrating an operation of the sub-pack aligner SHPA moving in the first direction DR1.

Referring further to FIGS. 10, 11, 14, and 15, the first motor HPM1 may move in an orthogonal direction ODR by the controller CTR. The sub-pack aligner SHPA including the connection member CM and the sub-head pack SHP coupled to the connection member CM may move in the first rotation direction RDR1 through the first motor HPM1 coupled to a first end CMa of the connection member CM. The connection member CM and the sub-head pack SHP may move in the first rotation direction RDR1 with the first bearing HPB1 coupled to the first end CMa of the connection member CM as an axis.

The second motor HPM2 may move in the first direction DR1 by the controller CTR. The sub-pack aligner SHPA and the sub-head pack SHP may move in the first direction DR1 through the second motor HPM2 coupled to the first end CMa of the connection member CM. At this time, the sub-pack aligner SHPA and the sub-head pack SHP may move in the first direction DR1 along the guide member GM coupled to a second end CMb of the connection member CM.

As the controller CTR aligns the sub-head pack SHP in the first rotation direction RDR1 using the first motor HPM1 and aligns the sub-head pack SHP in the first direction DR1 using the second motor HPM2, the sub-head pack SHP may be automatically aligned by the sub-pack aligner SHPA. In addition, the sub-head pack SHP may be individually aligned in the first rotation direction RDR1 and the first direction DR1 by the first motor HPM1 and the second motor HPM2.

Figure 16:
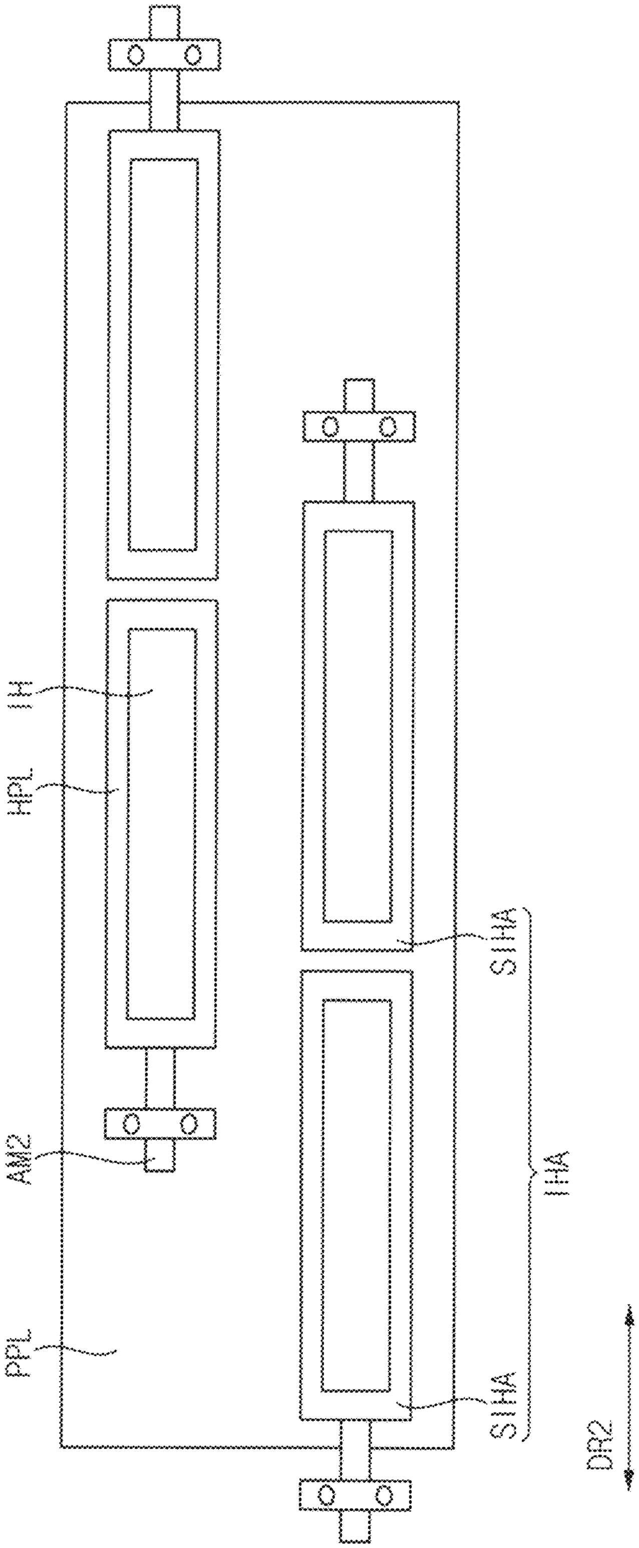
Figure 17:
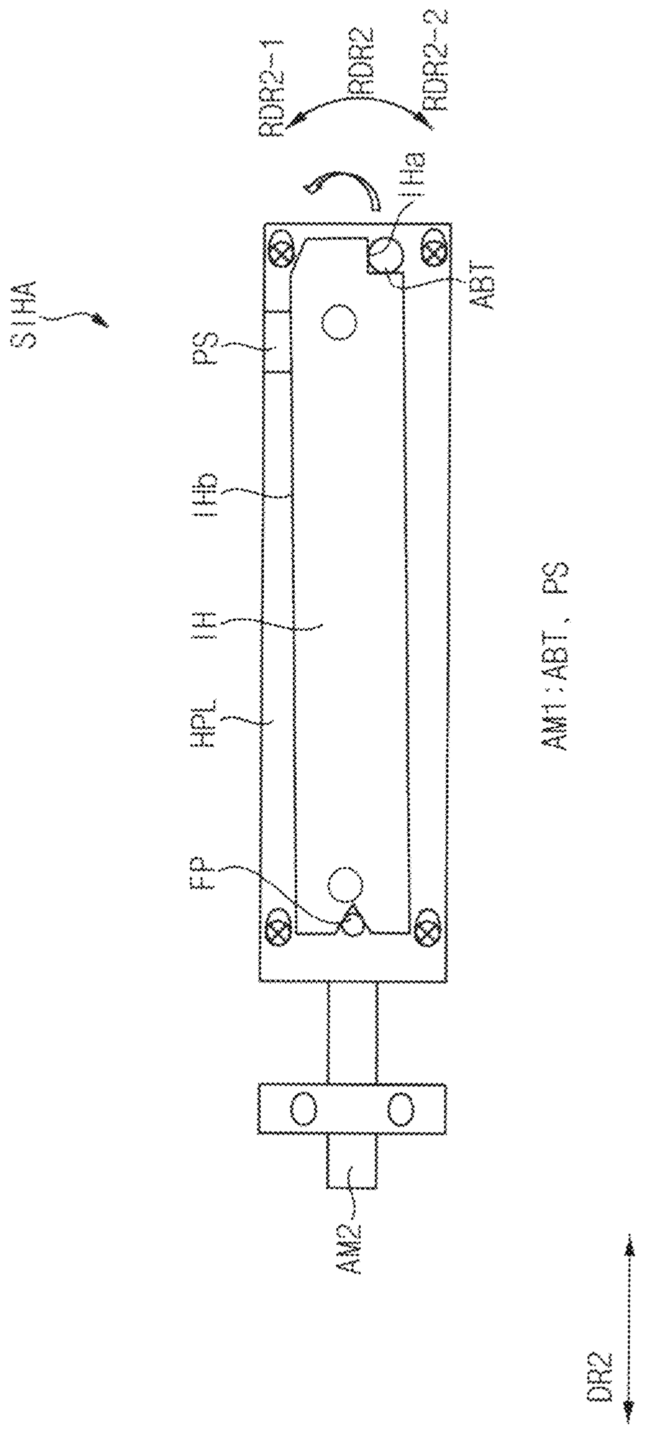
Figure 18:
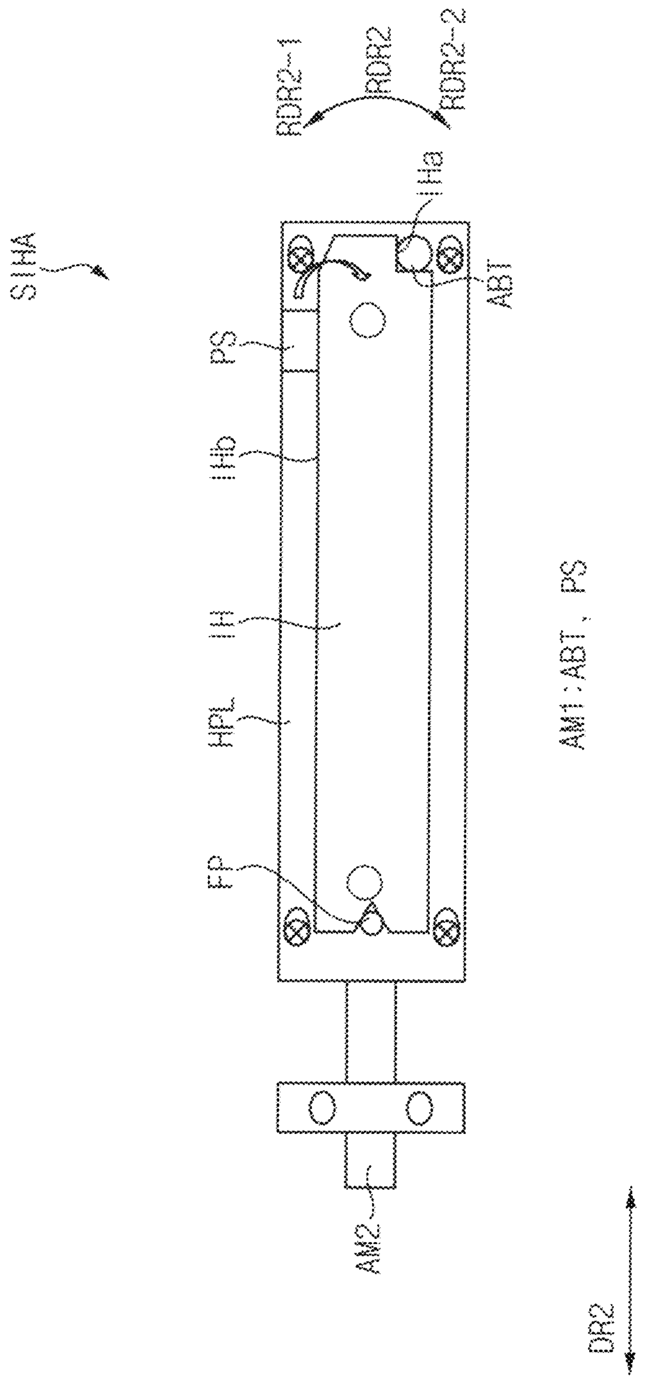

FIGS. 16 to 21 are plan views illustrating a method in which the sub-head aligner SIHA aligns the inkjet head IH. In an embodiment, FIGS. 17 and 18 are plan views illustrating an operation in which the sub-head aligner SIHA aligns the inkjet head IH in the second rotation direction RDR2, for example.

Referring to FIGS. 16 to 18, the sub-head pack (e.g., the sub-head pack SHP of FIG. 11) may include a pack plate PPL and the sub-head aligners SIHA may be disposed on the pack plate PPL.

The sub-head aligner SIHA may include a first adjusting member AM1, a second adjusting member AM2, a head plate HPL, a first fixing bolt FBT1 (refer to FIG. 19), a second fixing bolt FBT2 (refer to FIG. 19), and a fixing pin FP.

The sub-head aligner SIHA may move the inkjet head IH in a second rotation direction RDR2 using the first adjusting member AM1. The second rotation direction RDR2 may include a second-first rotation direction RDR2-1 (e.g., counterclockwise direction) and a second-second rotation direction RDR2-2 (e.g., clockwise direction). The second-second rotation direction RDR2-2 may be opposite to the second-first rotation direction RDR2-1.

The first adjusting member AM1 may include an adjusting bolt ABT and a leaf spring PS. The adjusting bolt ABT may move the inkjet head IH in the second-first rotation direction RDR2-1. The first adjusting member AM1 may adjust a moving distance of the inkjet head IH according to a degree of eccentricity of the adjusting bolt ABT.

The leaf spring PS may move the inkjet head IH in the second-second rotation direction RDR2-2. The leaf spring PS may return a position of the inkjet head IH moved in the second-first rotation direction RDR2-1 by the adjusting bolt ABT to the second-second rotation direction RDR2-2.

Specifically, when the degree of eccentricity of the adjusting bolt ABT is substantially large, the adjusting bolt ABT may push the inkjet head IH. Accordingly, the inkjet head IH may move in the second-first rotation direction RDR2-1. Thereafter, when the degree of eccentricity of the adjusting bolt ABT decreases, an external force applied by the adjusting bolt ABT applied to a first surface IHa of the inkjet head IH may disappear. Accordingly, the leaf spring PS may push the inkjet head IH. Accordingly, the inkjet head IH may move again in the second-second rotation direction RDR2-2. That is, the inkjet head IH moved in the second-first rotation direction RDR2-1 may return to its original position by the leaf spring PS.

Figure 19:
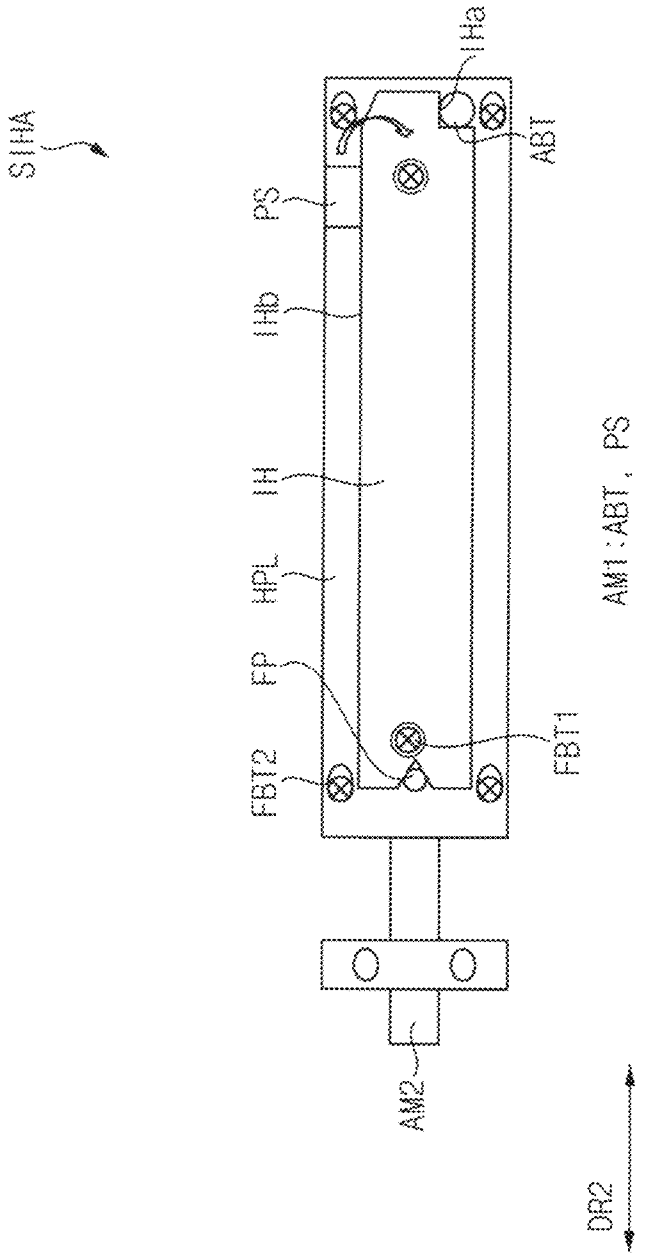

Referring further to FIG. 19, after the inkjet head IH is aligned in the second rotation direction RDR2, the inkjet head IH may be fixed to the head plate HPL. The first fixing bolt FBT1 may be coupled to a hole defined in the inkjet head IH. Accordingly, the inkjet head IH may be fixed to the head plate HPL in the second rotation direction RDR2 by the first fixing bolt FBT1.

Figure 20:
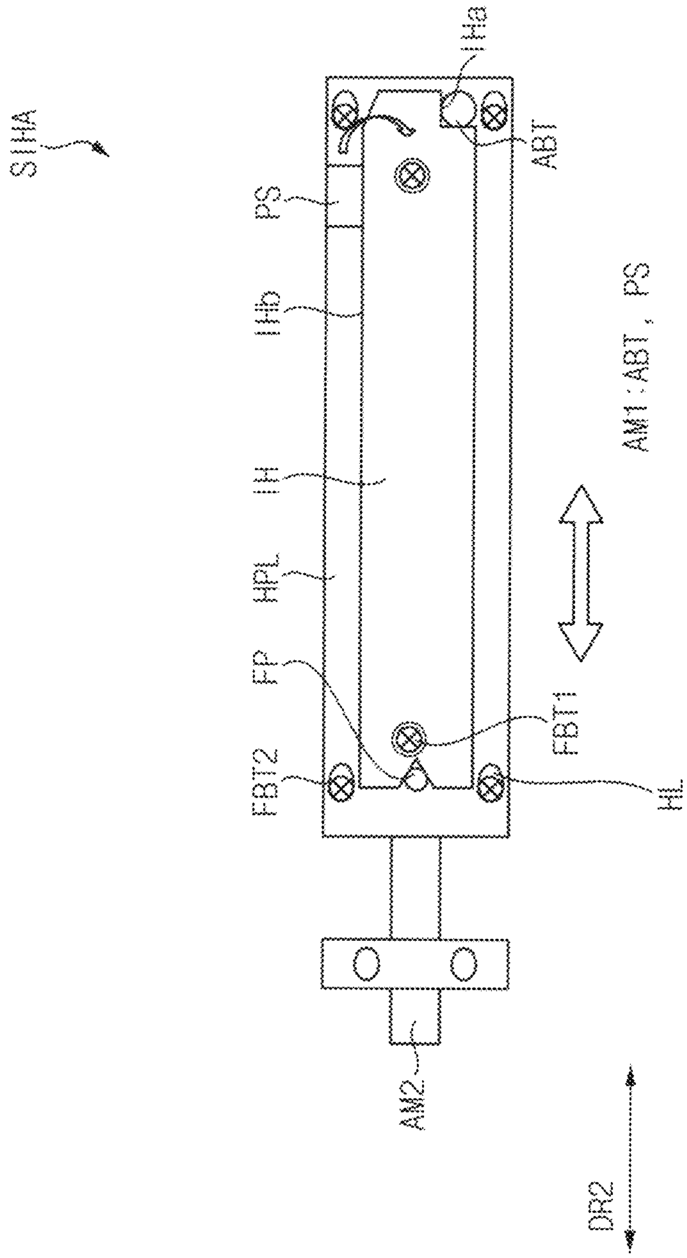
Figure 21:
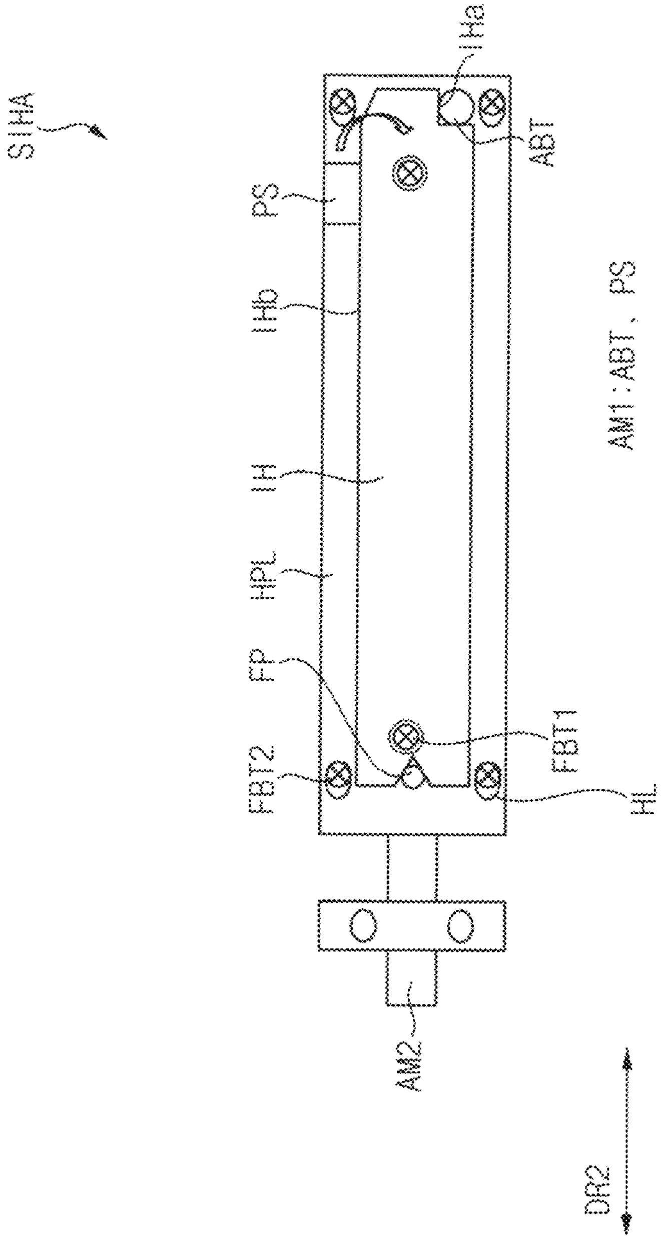

FIGS. 20 and 21 are plan views illustrating an operation in which the sub-head aligner SIHA aligns the inkjet head IH in the second direction DR2.

Referring further to FIGS. 20 and 21, the inkjet head IH may be moved in the second direction DR2 using the second adjusting member AM2. The second adjusting member AM2 may be coupled to the head plate HPL. The second adjusting member AM2 may be fixed to the pack plate PPL.

The second adjusting member AM2 may include a first thread (e.g., the first thread TH1 in FIG. 9), and the head plate HPL may include a second thread (e.g., the second thread TH2 in FIG. 9). The first thread may be rotationally coupled to the second thread.

When the first thread is rotationally coupled to the second thread, the head plate HPL may move in the second direction DR2. Since the second adjusting member AM2 is fixed to the pack plate PPL and a position of the second adjusting member may not be changed, as the first thread and the second thread are rotationally coupled, the head plate HPL may move in the second direction DR2.

Holes HL may be defined in the head plate HPL. The second fixing bolts FBT2 may be coupled to the holes HL, respectively. The second fixing bolts FBT2 may be fixed to the pack plate PPL.

A shape of the hole HL may be an elliptical shape elongated in the second direction DR2. Accordingly, since the hole HL has an elliptical shape, a position of the second fixing bolt FBT2 may be changed in the hole HL in the second direction DR2. That is, when the head plate HPL moves closer to the second adjusting member AM2 in the second direction DR2, the second fixing bolt FBT2 may be relatively far from the second adjusting member AM2. When the head plate HPL moves away from the second adjusting member AM2 in the second direction DR2, the second fixing bolt FBT2 may be relatively near the second adjusting member AM2. Accordingly, even when the second fixing bolt FBT2 is coupled to the pack plate PPL, the head plate HPL may move.

After the inkjet head IH is aligned in the second direction DR2, the head plate HPL may be fixed to the pack plate PPL. After the inkjet head IH is aligned in the second direction DR2, the second fixing bolts FBT2 may fix the head plate HPL.

The inkjet head IH may be individually aligned in the second rotation direction RDR2 and the second direction DR2 by the sub-head aligner SIHA.

In an embodiment, as the head pack HP is individually aligned in the first rotation direction RDR1 and the first direction DR1 by the head pack aligner HPA, and the inkjet head IH is individually aligned in the second rotation direction RDR2 and the second direction DR2 by the head aligner IHA, so that the alignment degree of the head pack HP and the inkjet head IH may be improved. Accordingly, when the inkjet printing process is performed using the inkjet apparatus, the print quality may be improved and the yield may be improved.

The inkjet apparatus and the method in the embodiments may be applied to a display device included in a computer, a notebook, a mobile phone, a smartphone, a smart pad, a portable media player ("PMP"), a personal digital assistance ("PDA"), an MP3 player, or the like.

Although the inkjet apparatus and the method in the embodiments have been described with reference to the drawings, the illustrated embodiments are examples, and may be modified and changed by a person having ordinary knowledge in the relevant technical field without departing from the technical spirit described in the following claims.

What is claimed is:

1. An inkjet apparatus comprising:
- a head pack including a plurality of sub-head packs;
- an inkjet head coupled to each of the plurality of sub-head packs;
- a head pack aligner coupled to each of the plurality of sub-head packs, and including:
  - a first motor which moves each of the plurality of sub-head packs in a first rotation direction with reference to a first axis;
  - a second motor which is disposed on the first motor and moves each of the plurality of sub-head packs in a first direction which is a longitudinal direction of each of the plurality of sub-head packs in a plan view; and
  - a controller which controls a moving position of each of the plurality of sub-head packs; and
- a head aligner coupled to the inkjet head interposed between a sub-head pack of the plurality of sub-head packs and the head aligner, the head aligner including:
  - a first adjusting member which moves the inkjet head in a second rotation direction with reference to a second axis different from the first axis; and
  - a second adjusting member which moves the inkjet head in a second direction which is a longitudinal direction of each of the inkjet head.

2. The inkjet apparatus of claim 1, wherein the head pack aligner includes a first bearing as an axis in the first rotation direction, a connection member disposed between the first bearing and the first motor and coupled to each of the plurality of sub-head packs, and a second bearing coupling the connection member, the first motor and the second motor.

3. The inkjet apparatus of claim 2, wherein the first bearing is coupled to a first end of the connection member,
- the first motor is coupled to a second end of the connection member in a direction which is perpendicular to the first direction and a direction parallel to a rotation axis of the first rotation direction, and
- the second motor is coupled to the second end of the connection member in the first direction.

4. The inkjet apparatus of claim 2, wherein the head pack aligner moves each of the plurality of sub-head packs in the first rotation direction using the first bearing and the first motor.

5. The inkjet apparatus of claim 2, wherein the head pack aligner further includes a guide member disposed under the first bearing.

6. The inkjet apparatus of claim 5, wherein the head pack aligner moves each of the plurality of sub-head packs in the first direction using the second motor and the guide member.

7. The inkjet apparatus of claim 1, further comprising:
- a detector disposed under the head pack.

8. The inkjet apparatus of claim 7, wherein the controller controls a moving position of each of the plurality of sub-head packs in response to image information received from the detector.

9. The inkjet apparatus of claim 1, wherein the head aligner further includes a head plate disposed each of the plurality of sub-head packs, and
- the inkjet head is rotatably coupled to the head plate.

10. The inkjet apparatus of claim 9, wherein the first adjusting member includes an adjusting bolt contacting a first surface of the inkjet head and a leaf spring contacting a second surface opposite to the first surface.

11. The inkjet apparatus of claim 9, wherein the second adjusting member is coupled to a first end of the head plate in the second direction and is fixed to each of the plurality of sub-head packs.

12. The inkjet apparatus of claim 9, wherein the head aligner further includes a first fixing bolt fixing the inkjet head and a second fixing bolt fixing the head plate.

13. A method of aligning an inkjet apparatus, the method comprising:

detecting a position of a sub-head pack included in a head pack through a detector disposed under the sub-head pack;

controlling a moving position of the sub-head pack in a first rotation direction with reference to a first axis using a first motor receiving image information from the detector, and controlling a moving position of the sub-head pack using a second motor in a first direction which is a longitudinal direction of the sub-head pack in a plan view;

moving an inkjet head disposed below the sub-head pack in a second rotation direction with reference to a second axis different from the first axis using a first adjusting member; and moving the inkjet head using a second adjusting member in a second direction which is a longitudinal direction of the inkjet head.

14. The method of claim 13, wherein the first motor moves in a direction perpendicular to a direction parallel to a rotation axis of the first rotation direction and the first direction, and the sub-head pack coupled to a connection member moves in the first rotation direction with reference to a first bearing as an axis through the first motor coupled to a first end of the connection member.

15. The method of claim 13, wherein the second motor moves in the first direction, and the sub-head pack coupled to a connection member moves in the first direction along a guide member coupled to a second end of the connection member through the second motor coupled to a first end of the connection member.

16. The method of claim 13, wherein the detector photographs an align mark disposed on a lower surface of the sub-head pack, a controller connected to the detector calculates a moving position in the first rotation direction and a moving position in the first direction of the sub-head pack, respectively, receiving photographed image information, and the controller drives the first motor and the second motor, respectively, using a calculated moving position in the first rotation direction and the calculated moving position in the first direction.

17. The method of claim 13, wherein the second rotation direction includes a second-first rotation direction and a second-second rotation direction opposite to the second-first rotation direction, and the first adjusting member includes an adjusting bolt moving the inkjet head in the second-first rotation direction and a leaf spring moving the inkjet head in the second-second rotation direction.

18. The method of claim 13, wherein the second adjusting member is coupled to a head plate to which the inkjet head is coupled and is fixed to the sub-head pack.

19. The method of claim 18, wherein the second adjusting member includes a first thread and the head plate includes a second thread.

20. The method of claim 19, wherein the head plate moves in the second direction when the first thread is rotationally coupled to the second thread.

* * * * *